United States Patent [19]

Dunn

[11] 4,160,324
[45] Jul. 10, 1979

[54] TOOL FOR LAYOUT OF BASEBALL DIAMONDS (DU-BER)

[76] Inventor: Cecil C. Dunn, 1900 W. 9th, Apt. 212, Ft. Stockton, Tex. 79735

[21] Appl. No.: 861,866

[22] Filed: Dec. 19, 1977

[51] Int. Cl.² .................................................. G01B 3/10
[52] U.S. Cl. ....................................... 33/137 R; 33/138
[58] Field of Search ............................. 33/137 R, 138

[56] References Cited

U.S. PATENT DOCUMENTS

| 3,039,197 | 6/1962 | Abbott | 33/137 R |
| 3,668,781 | 6/1972 | Teter | 33/138 |

FOREIGN PATENT DOCUMENTS

| 274016 | 10/1964 | Australia | 33/137 R |
| 2213 of | 1889 | United Kingdom | 33/137 R |

Primary Examiner—Steven L. Stephan
Attorney, Agent, or Firm—A. Mercedes; Donald E. La Mara

[57] ABSTRACT

A tool for quickly and easily laying out all of the components of a baseball diamond, the tool consisting of an elongated tape, or equivalent flexible object, which has a row of openings along its length that are properly spaced apart and from its end, each opening being identified, and the tape being adaptable to be wound up upon a reel, for convenient carrying by a person; the tool being associated with an instruction booklet for proper use of the tool.

2 Claims, 9 Drawing Figures

U.S. Patent   Jul. 10, 1979   4,160,324
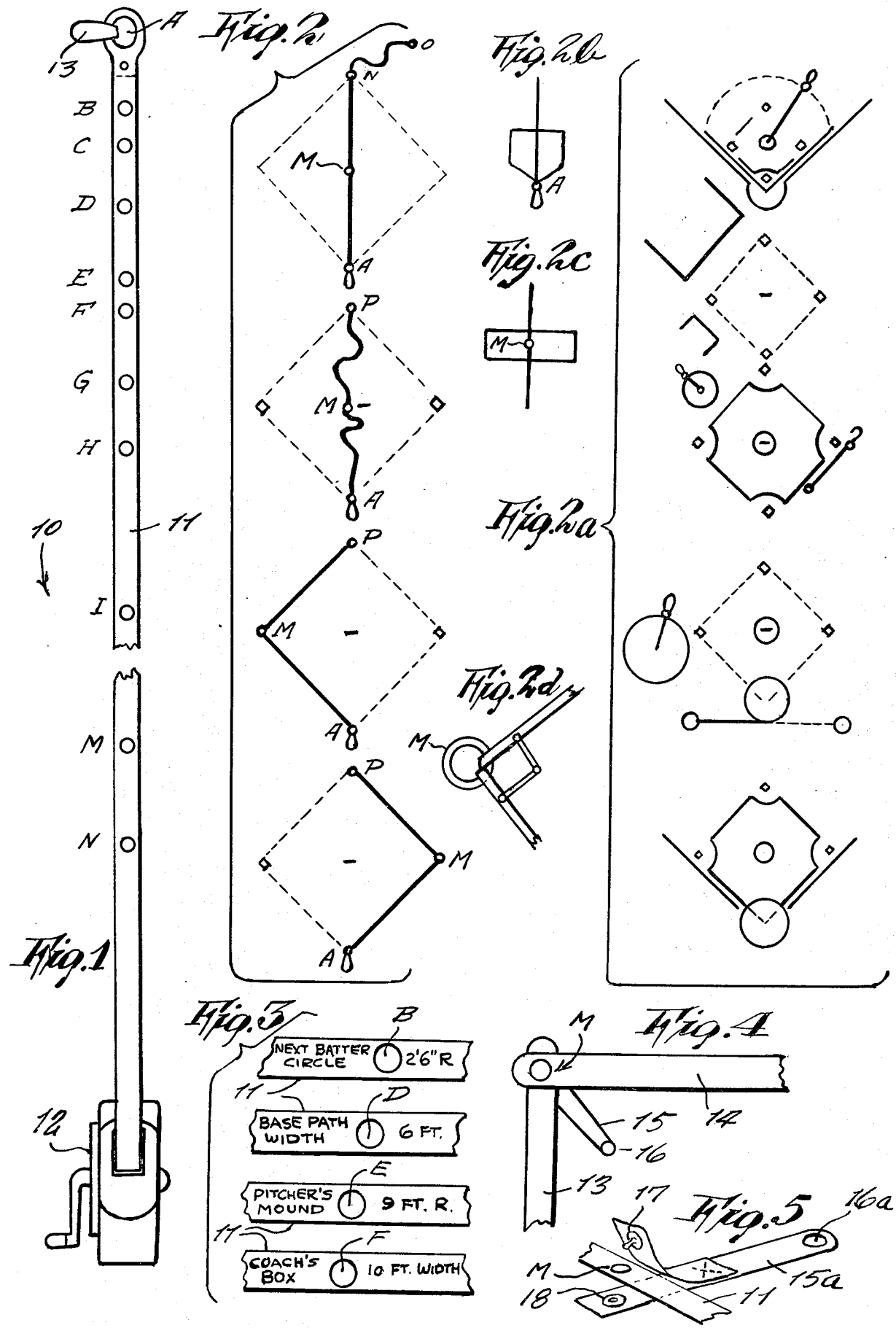

TOOL FOR LAYOUT OF BASEBALL DIAMONDS (DU-BER)

This invention relates generally to measuring tools.

A principal object of the present invention is to provide a tool for layout of baseball diamonds, and which is designed to determine by computation the location of fixed distances, and being calibrated to comply with the measurements associated with all regulated baseball, softball, such as for male or female, and all other league fields, such as sixty foot small boys' league fields.

Another object is to provide a tool for layout of baseball diamonds, which is capable of determining the layout of the complete diamond, including the placement of bases, base lines, pitcher's slabs, forty-five foot line to a first base, the radius between clay infield and grass outfield, as well as a next batter's box, three foot base line, six foot base path, coach's box, pitcher's mound radius, and the radius around each base. The next batter's box, three foot base line, six foot base path, coach's box, pitcher's mound radius, and radius around each base, are also referred to as component parts of a baseball field.

Yet a further object is to provide a tool for layout of baseball diamonds, which can accurately lay out the diamond regardless of its size, or its component parts, within less than five minutes, or it can also relocate any of these measurements, as needed.

Yet a further object is to provide a tool for layout of baseball diamonds, which can be used by only one person, thus saving on labor cost, time and effort, by accomplishing the same quickly and accurately.

Other objects are to provide a tool for layout of baseball diamonds, which is simple in design, inexpensive to manufacture, rugged in construction, easy to use and efficient in operation.

These, and other objects will be readily evident, upon a study of the following specification, and the accompanying drawing; wherein:

FIG. 1 is a view of the invention, shown partly unreeled from a tape reel;

FIG. 2 shows several diagrams of the invention in use, laying out a baseball diamond;

FIG. 2a is a view of enlarged details of structures shown in FIG. 2;

FIG. 2b shows the batter's box enlarged;

FIG. 2c shows the pitcher's box enlarged;

FIG. 2d is an enlarged detail of the center ring with pull toggle;

FIG. 3 is a detail of portions of the tape;

FIG. 4 illustrates a detail of a whip formed along the tape, and

FIG. 5 illustrates a modified design of whip, that is detachable from the tape, in order to not interfere with the winding or unwinding of the tape from the reel.

Referring now to the drawing in greater detail, the reference numeral 10 represents a tool for layout of a baseball diamonds wherein there is an elongated, flexible measuring stick, which may be comprised either of a chain, ribbon, rope, tape 11, or other equivalent material, in order that, when not in use, it may be wound up upon a reel 12, for the purpose of convenient storage. A leading end of the tape may be fitted with a pull ring 13, extending from an opening A. Along the length of the tape 11, there are made a row of openings, such as are shown in FIG. 1, and wherein each opening is identified by an alphabetical letter. Each of these openings is used for specifically identifying a location for a particular component of the baseball diamond. The use of this tape is illustrated in detail in FIGS. 2 through 2d.

The use of the tool and each specific opening along the tape are as follows:

| HOLE OR MARK DESIGNATION | DISTANCE FROM MASTER RING | UTILITY PURPOSE |
| --- | --- | --- |
| A. | Master Ring | All measurements originate from this point. |
| B. | 2 feet, 6 inches | Next batter up |
| C. | 3 feet | Base line to grass |
| D. | 6 feet | Base line, home to first and home to third |
| E. | 9 feet | Radius of pitcher's mound |
| F. | 10 feet | Width of coach's box |
| G. | 13 feet | Radius grass line to bases, and home plate clay circle radius |
| H. | 15 feet | Distance from base line to coaches' box |
| I. | 20 feet | Length of coaches' box |
| J. | 37 feet | Establishes center of next batter's box/circle |
| K. | 45 feet | Indicates 3 foot line (1st base only). |
| L. | 60 feet, 6 inches | Indicates distance from home plate to center of pitcher's slab |
| M. | 90 feet | Center of Du-Ber. Also indicates distance between bases (i.e. 1st to 2nd, etc.) |
| N. | 95 feet | Clay infield - grass outfield radius |
| O. | 127 feet, 3¾ inches | Indicates distance from home to second base |
| P. | 180 feet | Indicates overall length of measurements for Du-Ber. Also, indicates distance from home to 1st to 2nd; or 1st to 2nd to 3rd, etc. |

The following are illustrations in laying out ball diamond and component parts. (Illustrations are for a baseball size field. Procedure remains the same for all other regulation softball and youth-league fields, with the measurements changed on the "Du-Ber" to comply with the measurements associated with the fields.)

Step 1: Setting pitcher's slab and second base

Anchor Master Ring at home plate as indicated in FIG. 1A. "Du-Ber" will remain anchored in this position throughout the four steps in staking out the field (i.e. setting position of bases and base anchors).

Extending "Du-Ber" toward center field, pull taut and anchor second base (N). The pitcher's slab has automatically been positioned (L) at sixty feet six inches.

Step 2:

Remove indicator (N) from second base stake and replace with one hundred eighty feet indicator (P). "Du-Ber" will be slack, as shown.

Step 3: Setting third base

With indicator (P) remaining at second base position, with ninety feet center indicator (M) walk toward third base position. Pull taut for third base position. Use whip for exact pin placement (illustration and explanation shown on separate page).

Step 4: Setting first base

With (P) still remaining in second base position, remove (M) from third base position and repeat procedure for first base positioning. Walk toward first base position, pull taut for base placement. Use whip for exact pin placement.

All bases and pitcher's slab have been established.

Step 5: Radius between clay infield grass outfield

Anchor (A) Master Ring, at rear center of pitcher's slab. Extend "Du-Ber" to ninety-five foot indicator (N), pulling taut, removing all slack, walk a radius from foul line beyond first base to foul line beyond third base, as illustrated.

Step 6: Coaches box

Stake Master Ring (A) at back of third base. Extend "Du-Ber" to fifteen feet (H) for distance from base. Remove Master Ring (A) from third base position, and reposition at this fifteen foot mark (H). With (A) secured, extend "Du-Ber" to twenty feet indicator (I) for length of coaches' box. With (A) still secured, extend to ten feet indicator (E), to determine the width of coaches' box. Repeat procedure for first base.

Step 7: 45 Foot line (first base only)

Secure Master Ring (A) at first base, and extend "Du-Ber" to indicator (K) to establish forty-five foot line as illustrated.

Step 8: Pitcher's mound radius

Secure Master Ring (A) at center of pitcher's slab. Extend "Du-Ber" to nine feet indicator (E), and strike radius around pitcher's mound.

Step 9: Next batter up box/circle

Secure (A) at home plate, and extend "Du-Ber" to thirteen feet indicator (G), and measure directly behind home plate. Remove (A), and secure at this point, and at a right angle, extend "Du-Ber" to thirty-seven feet indicator (J) for center point of next batter's box/circle. Remove (A), and secure at this point. Extend "Du-Ber" to two feet six inches indicator (B), and strike radius for next batter's circle.

Step 10: Radius infield base line

Secure (A) at first base. Extend "Du-Ber" to thirteen feet indicator (G), and strike thirteen foot radius around base. Repeat procedure for all bases.

The illustration below indicates placement of marking devices on the "Du-Ber", and their measurements to comply with the regulation baseball field.

Softball and youth League measurements are given separately, as the "Du-Ber" will be in three (3) sizes to comply with these fields.

BASEBALL

A. Indicates distance from home plate to second base line.
B. Indicates radius between clay infield and grass outfield.
C. Indicates distance from home plate to center of pitcher's slab.
D. Indicates three foot line marker (first base only).
E. Indicates distance between bases, (home to first, first to second, etc.).
F. Indicates overall length of "Du-Ber". Also distance from home to first to second; or first to second to third base, etc.

SOFTBALL ("Du-Ber" will perform same function. Placement of markers and overall length will comply to softball field measurements indicated below).
A. Eighty-four feet, ten and one quarter inches.
B. No radius marker on softball "Du-Ber".
C. Forty-six feet for male fast pitch, and male and female slow pitch. Forty feet for fast female pitch.
D. Thirty feet
E. Sixty feet
F. One hundred and twenty feet

YOUTH LEAGUE ("Du-Ber" will perform same function. Placement of markers and overall length will comply to Youth League field measurements indicated below.)
A. Eighty-four feet, ten inches
B. Fifty feet
C. Forty six feet
D. None
E. Sixty feet
F. One hundred and twenty feet As is clearly shown in FIG. 3 of the drawing, the tape 11 may be imprinted with text and measurements, adjacent the various openings or holes, as shown. Instead of the tape being provided with reinforced holes, as shown, the tape may carry simply a mark at this point, if so preferred by a manufacturer.

The tape being made of tape components 13 and 14, which are pivotally joined at the hole M, thus serves also as a center point for a whip 15 that pivots therefrom, the outer end of the whip being provided with a hole 16. The construction of the hole M can be made by use of a grommet, in order to provide the pivoting motion.

In FIG. 5, a modified design of whip 15a is shown, which is detachable from the tape 11, so that it does not have to be wound up with the tape around the reel 12, and which thus will not interfere with the winding or unwinding of the tape from the reel. Whip 15a has a hole 16a in its end. An opposite end of the whip is attachable to the hole M, in a freely pivotable manner, by means of snap fastener elements 17 and 18, that extend through the hole M.

While various changes may be made in the detail construction, it is understood that such changes will be within the spirit and scope of the present invention, as is defined by the appended claims.

What I now claim is:

1. A tool for laying out of baseball diamonds, comprising, in combination, a measuring device of elongated shape, and which is made of a flexible material, such as tape or the like, a reel to which one end of said tape is attached, so that when not in use, said tape can then be wound up around said reel, an opposite end of said tape having a master ring defining a first hole along said tape, and said tape including a plurality of other openings along said tape, at specific calibrated distances from said master ring, for defining distances of components of said baseball diamonds; said measuring device, additionally, including a whip pivotally attached to said tape, said whip comprising a second tape member, snap-fastened through one of said holes along the first said tape, said whip including a hole at one end thereof, a snap-fastener element secured at an opposite end thereof, a short length of a third tape member secured, at its one end, to an intermediate portion of said second tape member, while an opposite end of said third tape member has a mating snap-fastener element engagable with said snap-fastener element of said second tape member.

2. The combination as set forth in claim 1, wherein said calibrated distances between said holes are made either for regulated baseball, softball, or youth league fields.

* * * * *